US010710666B2

(12) United States Patent
Makihara et al.

(10) Patent No.: US 10,710,666 B2
(45) Date of Patent: Jul. 14, 2020

(54) MOTORCYCLE FRAME

(71) Applicant: KAWASAKI JUKOGYO KABUSHIKI KAISHA, Kobe-Shi, Hyogo (JP)

(72) Inventors: Minoru Makihara, Kobe (JP); Hideaki Kawai, Akashi (JP)

(73) Assignee: Kawasaki Jukogyo Kabushiki Kaisha, Kobe-Shi (JP)

( * ) Notice: Subject to any disclaimer, the term of this patent is extended or adjusted under 35 U.S.C. 154(b) by 179 days.

(21) Appl. No.: 15/852,306

(22) Filed: Dec. 22, 2017

(65) Prior Publication Data

US 2018/0229797 A1 Aug. 16, 2018

(30) Foreign Application Priority Data

Feb. 14, 2017 (JP) ................. 2017-024653

(51) Int. Cl.
| | |
|---|---|
| B62K 11/04 | (2006.01) |
| B62K 19/18 | (2006.01) |
| B62K 25/28 | (2006.01) |
| B62M 7/04 | (2006.01) |
| B62H 1/02 | (2006.01) |

(52) U.S. Cl.
CPC ............. B62K 11/04 (2013.01); B62H 1/02 (2013.01); B62K 19/18 (2013.01); B62K 25/283 (2013.01)

(58) Field of Classification Search
CPC ........ B62K 11/02; B62K 11/04; B62K 19/18; B62K 19/20; B62K 19/28; B62K 25/283; B62M 7/02; B62M 7/04; B62M 7/06
USPC ................................. 180/219, 228
See application file for complete search history.

(56) References Cited

U.S. PATENT DOCUMENTS

| | | | | |
|---|---|---|---|---|
| 6,024,185 | A * | 2/2000 | Okada ................... | B62K 11/04 180/227 |
| 2011/0204613 | A1* | 8/2011 | Aoki ...................... | B62J 35/00 280/830 |
| 2011/0303477 | A1* | 12/2011 | Creixell ................. | B62K 11/04 180/374 |
| 2012/0175181 | A1* | 7/2012 | Fujiyanna .............. | B62K 11/04 180/291 |
| 2013/0154311 | A1* | 6/2013 | Keisuke ................. | B62K 19/06 296/205 |
| 2014/0367184 | A1* | 12/2014 | Matsuda ................ | B62K 11/04 180/220 |

(Continued)

FOREIGN PATENT DOCUMENTS

| | | |
|---|---|---|
| CN | 105658509 A | 6/2016 |
| WO | 2015/068187 A1 | 5/2015 |

OTHER PUBLICATIONS

Chinese Office Action (Application No. 201810043765.1) dated Aug. 26, 2019.

*Primary Examiner* — Anne Marie M Boehler
(74) *Attorney, Agent, or Firm* — Burr & Brown, PLLC (57) ABSTRACT

A motorcycle frame includes a head pipe, a pair of front main frames, and a pair of rear main frames. The pair of front main frames separates in a vehicle width direction from the head pipe, extends toward a power engine that is located on a rear side of the head pipe, and includes power-engine fixing parts that are fixed to the power engine at positions that overlap with the power engine as viewed in the vehicle width direction. The pair of rear main frames extends rearward from the power-engine fixing parts of the pair of front main frames.

5 Claims, 6 Drawing Sheets

(56) References Cited

U.S. PATENT DOCUMENTS

| | | | |
|---|---|---|---|
| 2015/0136510 A1* | 5/2015 | Naruoka | B62M 7/02 |
| | | | 180/219 |
| 2016/0068219 A1 | 3/2016 | Ozeki | |
| 2016/0107715 A1* | 4/2016 | Ishida | B62K 11/12 |
| | | | 180/219 |
| 2016/0264205 A1 | 9/2016 | Ishii et al. | |
| 2016/0290195 A1* | 10/2016 | Tanaka | F01N 1/083 |
| 2017/0101148 A1* | 4/2017 | Koishikawa | B62J 15/02 |
| 2017/0114708 A1* | 4/2017 | Hamaguchi | B62K 11/04 |
| 2017/0183055 A1* | 6/2017 | Takaya | B62K 11/04 |
| 2019/0047654 A1* | 2/2019 | Hasegawa | B62K 11/04 |

* cited by examiner

MOTORCYCLE FRAME

BACKGROUND OF THE INVENTION

Field of the Invention

The present invention relates to a motorcycle frame.

Description of the Background Art

Main frames disclosed in International Publication No. WO 2015/068187 form a truss structure in which upper and lower frames are connected by a connection frame.

The upper frame passes over the engine and extends toward the rear of the vehicle. A joint member is provided at the rear end of the lower frame, and a gusset frame is welded to the joint member. The gusset frame extends rearward and upward from the joint member and is joined to the upper frame. The joint member is fastened to an engine.

With International Publication No. WO 2015/068187, the strength and stiffness necessary for a motorcycle frame are achieved by supporting the joint member, which supports the engine, by the gusset frame, which extends from the upper frame, and by the lower frame.

There is demand for a further weight reduction of motorcycles and a further weight reduction of motorcycle frames.

SUMMARY OF THE INVENTION

It is an object of the present invention to further reduce the weight of a motorcycle frame that includes a structure for supporting a power engine, while ensuring required stiffness and strength.

A motorcycle frame according to an aspect includes a head pipe, a pair of front main frames that separate in a vehicle width direction from the head pipe, extend toward a power engine that is located on a rear side of the head pipe, and include power-engine fixing parts that are fixed to the power engine at positions that overlap with the power engine as viewed in the vehicle width direction, and a pair of rear main frames that extend rearward respectively from the power-engine fixing parts of the pair of front main frames.

With this motorcycle frame, the stiffness and strength necessary to support the power engine can be ensured with a structure in which the pair of front main frames extends toward the power engine, and the power-engine fixing parts are fixed to the power engine at positions that overlap with the power engine as viewed in the vehicle width direction. Since the front main frames do not have to include separate brackets or other supports that extend toward the power engine to fix the power engine, a further weight reduction of the motorcycle frame including a structure for supporting the power engine is possible while ensuring the stiffness and strength necessary to support the power engine.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
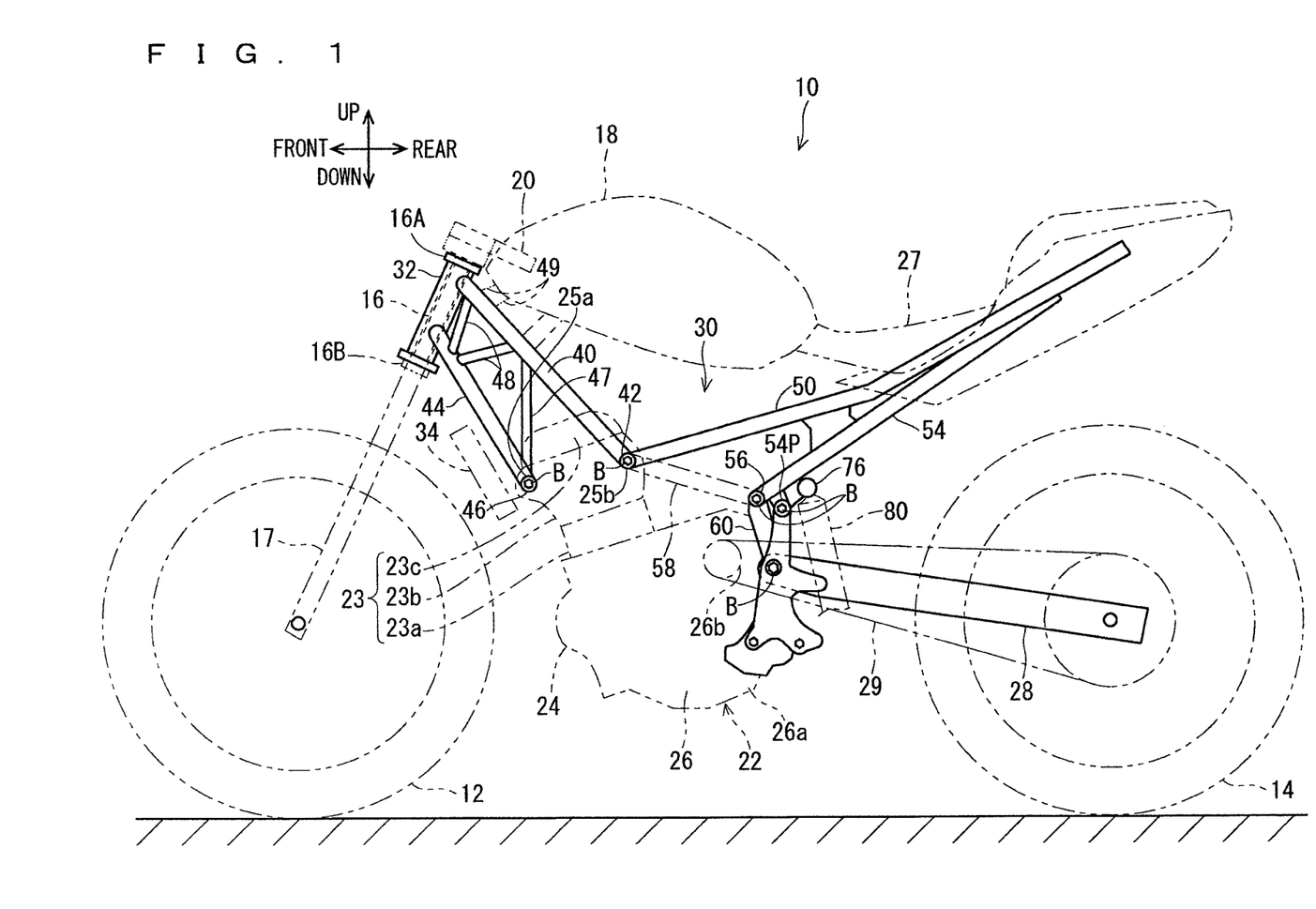
FIG. 1 is a schematic side view illustrating an overall configuration of a motorcycle that includes a motorcycle frame.
Figure 2:
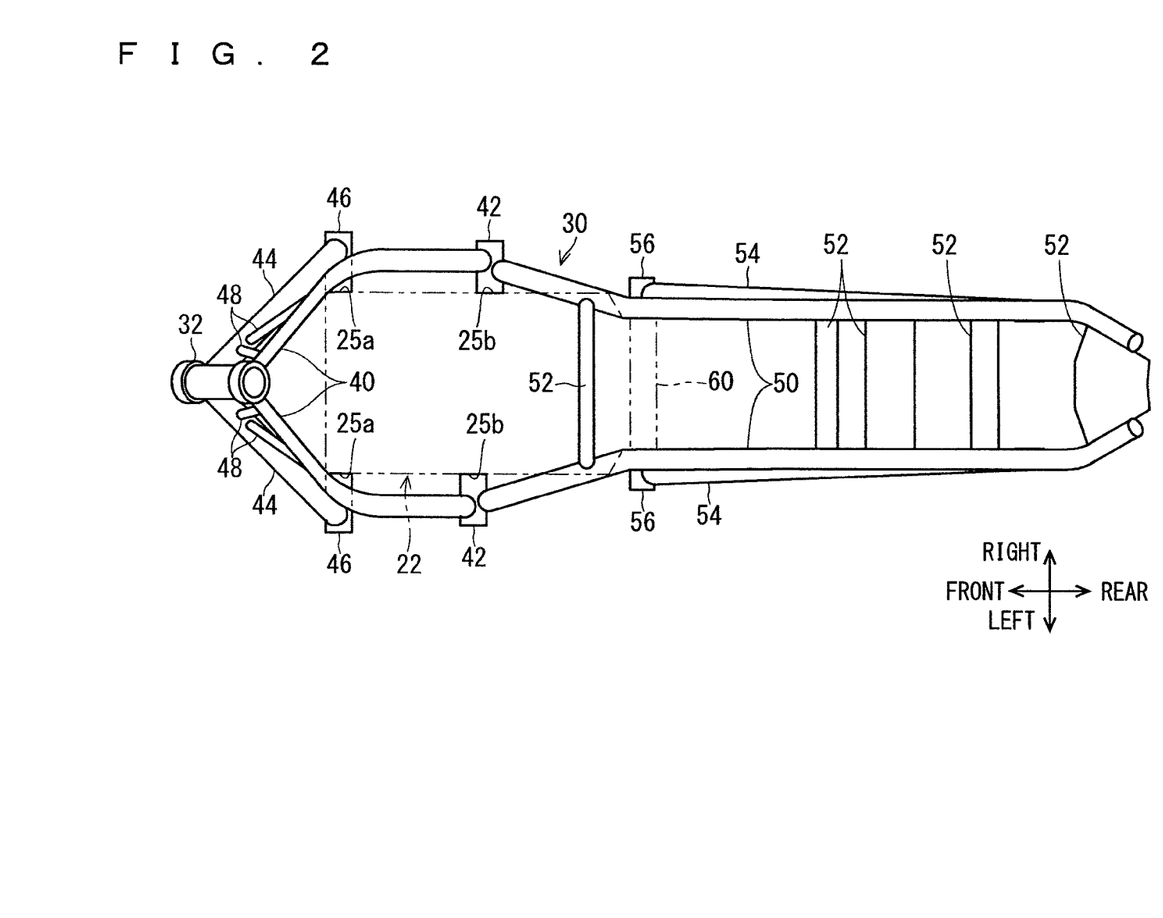
FIG. 2 is a plan view of the motorcycle frame.
Figure 3:
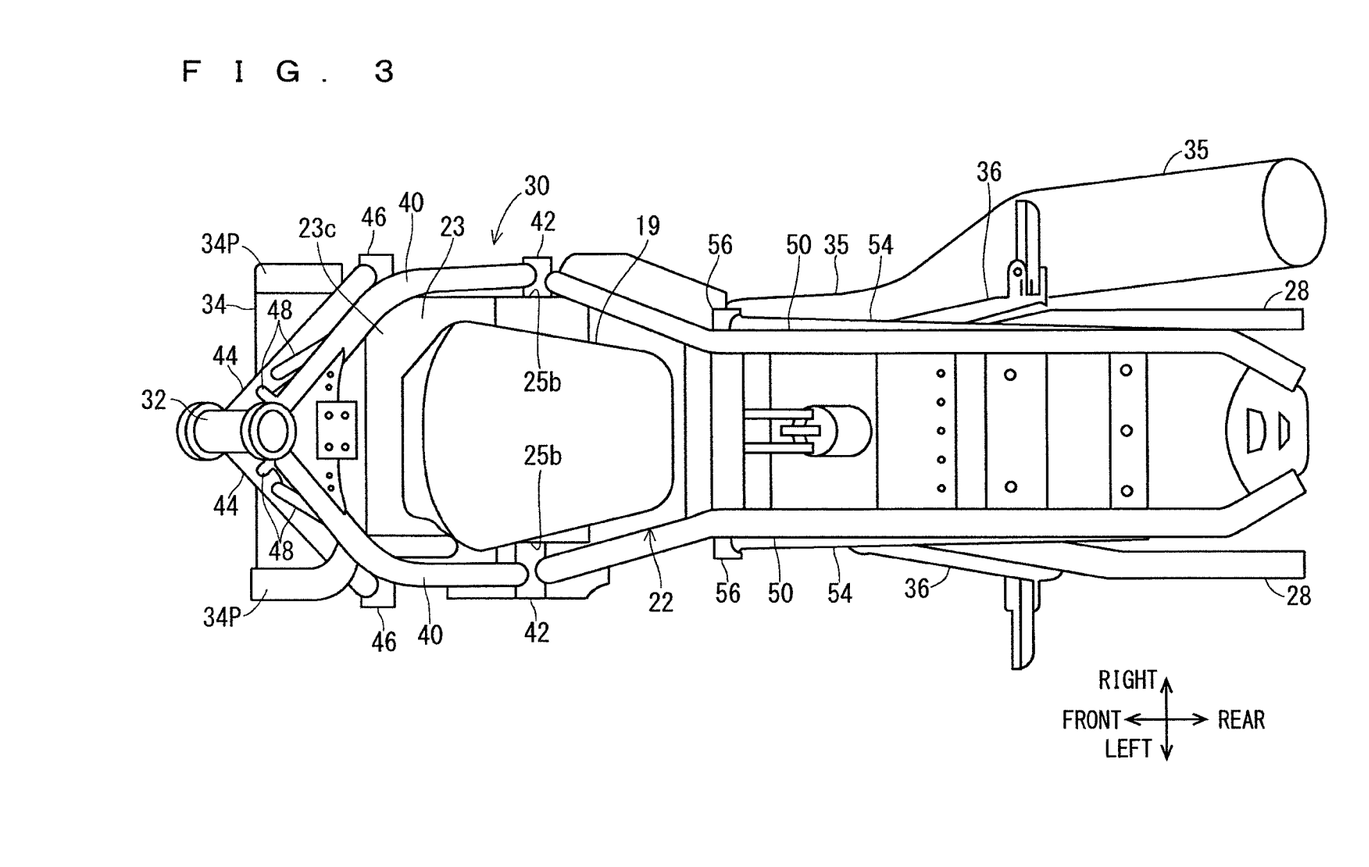
FIG. 3 is a plan view illustrating the positional relationship between the motorcycle frame and each part.
Figure 4:
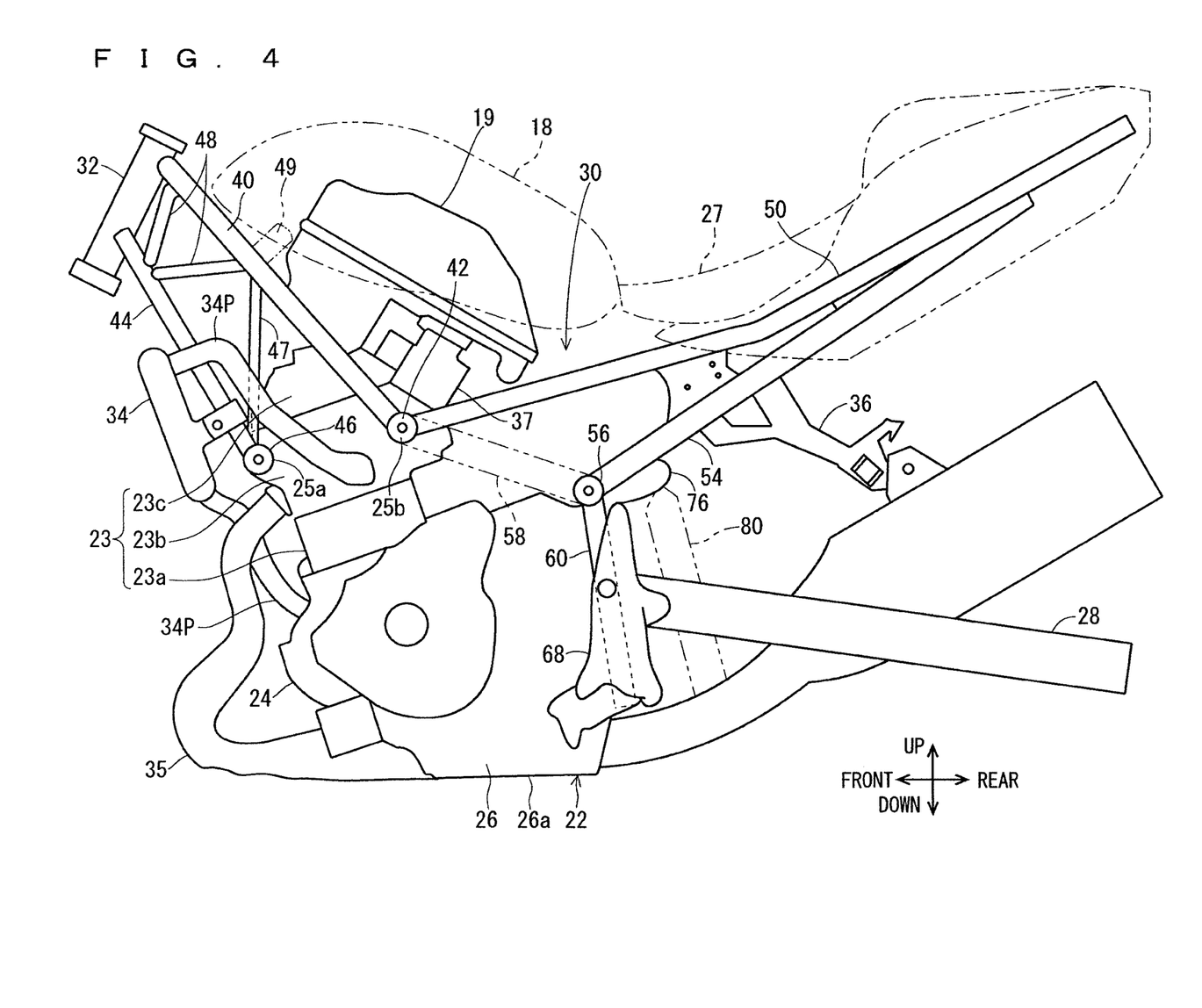
FIG. 4 is a side view illustrating the positional relationship between the motorcycle frame and each part.

Hereinafter, a motorcycle frame according to an embodiment will be described. FIG. 1 is a schematic side view illustrating an overall configuration of a motorcycle 10 that includes a motorcycle frame 30, FIG. 2 is a plan view of the motorcycle frame 30, FIG. 3 is a plan view illustrating the positional relationship between the motorcycle frame 30 and each part, and FIG. 4 is a side view illustrating the positional relationship between the motorcycle frame 30 and each part.

The overall configuration of the motorcycle 10 will now be described. The motorcycle 10 includes the motorcycle frame 30, a front wheel 12, a rear wheel 14, a handle device 20, and an engine 22 serving as a power engine. In the following description, up-and-down, back-and-forth, and right-and-left directions as referred to are each defined as follows. First, one side of the motorcycle 10 on which the front wheel 12 and the rear wheel 14 contact the road surface is referred to as a downward direction, and the opposite side thereof is referred to as an upward direction. A direction in which the motorcycle 10 travels is referred to as a forward direction, and the opposite direction thereof is referred to as a backward direction. With a user as a driver on the motorcycle 10, the right and left sides with respect to the user are referred to as right and left sides of the motorcycle 10. In embodiments of the present invention, the right-and-left direction may also be referred to as a vehicle width direction.

The motorcycle frame 30 includes a head pipe 32, a pair of front main frames 40, and a pair of rear main frames 50.

The head pipe 32 is provided at the front of the motorcycle 10. The head pipe 32 is disposed in such a posture that it tilts toward the front of the vehicle as going toward its lower end. The pair of front main frames 40 separates from the head pipe 32 to the right and left and extends rearward. The pair of rear main frames 50 is provided extending toward the rear of the vehicle from the rear ends of the pair of front main frames 40.

A steering shaft 16 is rotatably inserted through the head pipe 32. The steering shaft 16 supports an upper bracket 16A and an under bracket 16B. A front fork 17 is supported by the upper bracket 16A and the under bracket 16B so as to extend downward. The front fork 17 is configured to be extensible and compressible, and receives impact on the vehicle from the road surface and a load change due to acceleration and deceleration. The front wheel 12 is rotatably supported at the lower end of the front fork 17.

The handle device 20 is mounted on the upper bracket 16A or the front fork 17. By operating this handle device 20, the steering shaft 16, the upper bracket 16A, the under bracket 16B, and the front fork 17 are rotated, and this rotation causes the aforementioned front wheel 12 to rotate.

The engine 22 is installed to the lower side of the motorcycle frame 30, and a fuel tank 18 and a sheet 27 on which passengers can sit are installed on the upper side of the motorcycle frame 30.

The engine 22 is one example of a power engine and generates driving force to run the motorcycle 10. The engine 22 is disposed between the front wheel 12 and the rear wheel 14 in the back-and-forth direction of the vehicle, and more specifically, disposed forward of swing arms 28 in the vehicle. The engine 22 includes a cylinder assembly 23 and a crankcase 24.

The cylinder assembly 23 includes a cylinder block 23*a*, a cylinder head 23*b*, and a head cover 23*c*. The cylinder block 23*a* has an internal space that forms combustion chambers and in which a piston is housed so as to be movable to and fro. The cylinder head 23*b* includes built-in parts, such as an ignition plug and intake and exhaust valves, and covers the top of the cylinder block 23*a* to form the combustion chambers together with the cylinder block 23*a*. The head cover 23*c* is joined to the cylinder head 23*b* on the side opposite the cylinder block 23*a* and covers the intake and exhaust valves and other parts. The cylinder block 23*a* and the cylinder head 23*b* may be made of a metallic casting material and have higher strength and stiffness than the head cover 23*c*.

The crankcase 24 is joined to the cylinder block 23*a* on the side opposite the cylinder head 23*b* and rotatably supports a crank shaft.

In the present example, the engine 22 is a transverse engine in which a plurality of combustion chambers are formed in the cylinder assembly 23 and aligned in the vehicle width direction. Each combustion chamber extends in the up-and-down direction. More specifically, the combustion chambers extend in a forward-tilted direction that tilts toward the front of the vehicle as going upward. In other words, the direction in which the piston moves to and fro is the aforementioned forward-tilted direction. The crank shaft extends in the vehicle width direction. In the present embodiment, a two-cylinder engine that includes two combustion chambers is used as a power engine.

The cylinder assembly 23 is provided on the top of the crankcase 24. The cylinder assembly 23 is configured such that the cylinder head 23*b* is provided on the top of the cylinder block 23*a* and the head cover 23*c* is provided on the top of the cylinder head 23*b*. The cylinder block 23*a* has an inlet port for guiding drawn air to the combustion chambers, and an exhaust port for exhausting air from the combustion chambers.

The engine 22 is installed on the motorcycle frame 30 in such a posture that its upper part tilts toward the front of the vehicle. Thus, the cylinder head 23*b* is located on the oblique front side of the cylinder block 23*a*.

The cylinder assembly 23 has frame fixing parts 25*a* and 25*b* at positions close to the head pipe 32. In the present embodiment, the front frame fixing parts 25*a* are formed on opposite sides in the vehicle width direction at the front part of the cylinder head 23*b*, and the rear frame fixing parts 25*b* are formed on the opposite sides at the rear part. The front frame fixing parts 25*a* and the rear frame fixing parts 25*b* each may be configured to have a screw hole. Since the frame fixing parts 25*a* and 25*b* are formed on the cylinder head 23*b* that constitutes part of the combustion chambers, they have higher stiffness than the cylinder head cover 23*c* and can be more readily made to function as frame fixing parts than the cylinder head cover 23*c*. Because of having inlet and exhaust ports, the cylinder head 23*b* is larger in vertical dimension than the cylinder head cover 23*c* and therefore it is easier to form frame fixing parts on the cylinder head 23*b* than on the cylinder head cover 23*c*. In the present embodiment, the rear frame fixing parts 25*b* are disposed below the inlet port. The front frame fixing parts 25*a* are disposed above the exhaust port.

As another example, the cylinder head may be located immediately above the crankcase or on the oblique upper front side of the crankcase in side view.

The power engine may be a transverse engine that includes a single cylinder or more than two cylinders. As another alternative, the power engine may include an electric motor. In this case, the front and rear frame fixing parts may be formed at the front upper part of an electric motor case.

The engine 22 also includes a transmission 26 as one example of a transmission device for transmitting rotational driving force generated by the engine to the rear wheel 14. The transmission 26 is provided projecting toward the rear of the crankcase 24. The transmission 26 is configured such that parts such as gears for shifting and outputting rotational output are housed in a transmission case 26*a*. The transmission 26 has an output shaft 26*b* projecting therefrom on one side in the vehicle width direction.

A pivot bracket 60 is provided at the rear of the engine 22. The swing arms 28 are attached to this pivot bracket 60 to extend rearward and downward. The swing arms 28 are swingably supported in a posture extending obliquely rearward to move their rear ends up and down. The rear wheel 14 is rotatably supported on the rear ends of the swing arms 28.

The rotational output of the aforementioned output shaft 26*b* is transmitted via a power transmission mechanism 29 to the rear wheel 14. In the present example, the power transmission mechanism 29 may be a chain that is wound around a gear wheel of the output shaft 26*b* and a gear wheel of the rear wheel 14. As another example, the power transmission mechanism may be a ring-shaped belt such as a toothed belt. The power transmission mechanism may also be a shaft drive mechanism that includes, for example, a drive shaft and a bevel gear.

The motorcycle frame 30 will now be described in further detail. The motorcycle frame 30 includes the head pipe 32, the pair of front main frames 40, and the pair of rear main frames 50.

The head pipe 32 is made of a metallic circular cylindrical member that is open on both sides.

The pair of front main frames 40 is a long length of metallic member and joined to the outer circumference of the head pipe 32 by welding or other methods. The pair of front main frames 40 separates from the head pipe 32 to outer sides in the vehicle width direction as going toward the rear and extends toward the engine 22, which is located rearward of the head pipe 32. In the present example, the engine 22 is located rearward of and below the head pipe 32, and the rear frame fixing parts 25*b* are also located rearward of and below the head pipe 32.

In plan view, each front main frame 40 is formed in a shape that bends at an intermediate position in the back-and-forth direction. More specifically, the front main frames 40 are configured to have a front part and a rear part in plan view. The front parts of the pair of front main frames 40 are welded to the head pipe 32 and extend from the head pipe 32 to outer sides in the vehicle width direction as going toward the rear. The rear parts of the pair of front main frames 40 are continuously connected to the rear ends of the corresponding front parts and extend in parallel with each other in the back-and-forth direction.

When viewed in the vehicle width direction (viewed from one side), the pair of front main frames 40 extends obliquely downward toward the rear from the head pipe 32. The pair of front main frames 40, as viewed in the vehicle width direction, extends linearly from the head pipe 32 toward the rear frame fixing parts 25*b*. This layout enables further shortening the pair of front main frames 40. As another example, the pair of front main frames may bend along the way as viewed from an outer side in the vehicle width direction. In plan view, the pair of front main frames 40 extends obliquely outward in the vehicle width direction toward the rear, and after having extended outward to the same extent as the width of the engine 22, extends rearward in the back-and-forth direction of the vehicle.

The pair of front main frames 40 includes power-engine fixing parts 42. When viewed in the vehicle width direction, the power-engine fixing parts 42 are fixed to the engine 22 at positions that overlap with the engine 22. More specifically, the power-engine fixing parts 42 having insertion holes are fixed to the rear ends of the pair of front main frames 40 by welding or other methods. With the power-engine fixing parts 42 overlaying the rear frame fixing parts 25b of the engine 22, fasteners B such as bolts are inserted through the power-engine fixing parts 42 and fixed to the rear frame fixing parts 25b by screwing or other methods. Note that the fixing of the separate power-engine fixing parts to the front main frames is not an absolute necessity. For example, the front main frames may have holes that are used as power-engine fixing parts in which fasteners such as bolts are inserted.

Since being fixed to the right and left of the engine 22, the pair of front main frames 40 is coupled to each other in the vehicle width direction via the engine 22. This eliminates the need for the pair of front main frames 40 to include a coupling member that couples the front main frames 40 in the vehicle width direction. Alternatively, the pair of front main frames may be coupled to each other by a coupling member that extends in the vehicle width direction.

The pair of front main frames 40 and the power-engine fixing parts 42 do not necessarily have to have a bilaterally symmetrical structure, and for example, the right and left power-engine fixing parts 42 may be fixed at different positions to the engine 22. In the present embodiment, the right front main frame 40 is longer than the left front main frame 40, and the right power-engine fixing part 42 is located rearward of the left power-engine fixing part 42 in the vehicle. This is because the locations of the engine 22 where the strength suitable for forming the rear frame fixing parts 25b can be ensured may vary depending on circumstances such as bilateral asymmetry of the positions of water jackets on the engine 22.

The aforementioned pair of front main frames 40 is made of a metallic pipe member. As another example, the pair of front main frames may be other types of frames, such as frames with a metal plate pressed, casting frames made by casting molten metal into a mold, or forged frames manufactured by applying pressure to a metal with a metallic mold.

The aforementioned pair of front main frames 40 is coupled to tank supporters 49 that support the fuel tank 18 for storing a fuel such as gasoline supplied to the engine 22. The tank supporters 49 are a member made of, for example, a metal plate, and joined by welding or other methods to the parts of the pair of front main frames 40 that are close to the front of the vehicle. A front part of the fuel tank 18 is fixed to the tank supporters 49 by screwing or other methods. Other parts of the fuel tank 18 may also be supported on, for example, the pair of rear main frames 50 by brackets or other supports.

The fuel tank 18 supported as described above is provided at a position above the engine 22. The fuel tank 18 is also located on the upper side of the pair of front main frames 40 and the pair of rear main frames 50. When viewed in the vehicle width direction, the power-engine fixing parts 42 are provided at positions below the fuel tank 18. In the present example, power-engine fixing parts 46 are also provided at positions below the fuel tank 18. A central position in the back-and-forth direction of the vehicle is located between the power-engine fixing parts 42 and the sheet 27. Note that an anti-lock brake unit and a supercharger may be disposed in a space that is below the fuel tank 18 and the sheet 27 and above the engine 22.

When viewed from one side, the upper surfaces of the pair of front main frames 40 pass below the lower surface of the fuel tank 18. In the present embodiment, the upper surfaces of the pair of front main frames 40 pass below the lower surface of an air cleaner 19, which will be described later. In the present embodiment, the upper surfaces of the pair of front main frames 40 also pass below a throttle body 37, which will be described later, and the inlet port. This layout avoids interference between the pair of front main frames 40 and in-vehicle parts that are disposed below the fuel tank 18.

The power-engine fixing parts 42 are preferably provided forward of the central position in the back-and-forth direction of the vehicle. In consideration of factors such as errors in manufacturing the motorcycle frame 30, it is preferable that either the power-engine fixing parts 42 or 46 are formed in the shape of circular holes depending on the outer diameter of the fasteners B, and the other power-engine fixing parts 42 or 46 are formed in the shape of long holes or circular holes larger (slightly larger) than the outer diameter of the fasteners B.

The head pipe 32 is provided with a pair of front under frames 44. The pair of front under frames 44 is provided on the lower side of the pair of front main frames 40, separates from the head pipe 32 in the vehicle width direction as going toward the rear of the vehicle, and extends toward the engine 22 to be fixed to the engine 22.

More specifically, the pair of front under frames 44 is a long length of metallic member and joined to the outer circumference of the head pipe 32 by welding or other methods. The joints between the pair of front under frames 44 and the head pipe 32 are located below the joints between the pair of front main frames 40 and the head pipe 32.

The pair of front under frames 44 separates from the head pipe 32 to outer sides in the vehicle width direction and extends toward the engine 22, which is located rearward of the head pipe 32. In the present example, the front frame fixing parts 25a are located rearward of and below the head pipe 32 and also located forward of the rear frame fixing parts 25b.

In plan view, the front under frames 44 include parts that are located forward of and on the outer side in the width direction of the front main frames 40. In this layout, the front main frames 40 are arranged inside the vehicle body, thus readily suppressing an increase in the size of the vehicle body. Besides, a trapezoidal shape can be formed in a cross section perpendicular to the back-and-forth direction by connecting the pair of front main frames 40 and the pair of front under frames 44 with a straight line, thus making it easy to reduce bending stress occurring in each frame 40 or 44.

When viewed in the vehicle width direction (viewed from one side), the pair of front under frames 44 extends obliquely downward toward the rear from the head pipe 32. The pair of front under frames 44, as viewed in the vehicle width direction, extends linearly from the head pipe 32 toward the front frame fixing parts 25a. This layout enables further shortening the pair of front under frames 44. As another example, the pair of front under frames 44 may bend along the way as viewed from an outer side in the vehicle width direction. In plan view, the pair of front under frames 44 extends obliquely outward in the vehicle width direction toward the rear, and extends outward to the same extent as the width of the engine 22.

The pair of front under frames 44 includes the power-engine fixing parts 46. When viewed in the vehicle width direction, the power-engine fixing parts 46 are fixed to the engine 22 at positions that overlap with the engine 22. More specifically, the power-engine fixing parts 46 having insertion holes are fixed to the rear ends of the pair of front under frames 44 by welding or other methods. With the power-engine fixing parts 46 overlaying the front frame fixing parts 25*a* of the engine 22, fasteners B such as bolts are inserted through the power-engine fixing parts 46 and fixed to the front frame fixing parts 25*a* by screwing or other methods. Note that the fixing of the front under frames 44 to the power-engine fixing parts 46 by welding or other methods is not an absolute necessity. For example, the front under frames may have holes that are used as power-engine fixing parts in which fasteners such as bolts are inserted.

Since being fixed to the right and left of the engine 22, the pair of front under frames 44 is coupled to each other in the vehicle width direction via the engine 22. This eliminates the need for the pair of front under frames 44 to include a coupling member that couples the front under frames 44 in the vehicle width direction. Alternatively, the pair of front under frames may be coupled to each other by a coupling member that extends in the vehicle width direction.

The aforementioned pair of front under frames 44 is made of a metallic pipe member. As another example, the pair of front under frames may be other types of frames, such as frames with a metal plate pressed, casting frames made by casting molten metal into a mold, or forged frames manufactured by applying pressure to a metal with a metallic mold.

The pair of front under frames 44 and the power-engine fixing parts 46 do not necessarily have to have a bilaterally symmetrical structure, and for example, the right and left power-engine fixing parts 46 may be fixed at different positions to the engine 22. This is because the locations of the engine 22 where the strength suitable for forming the front frame fixing parts 25*a* can be ensured may vary depending on circumstances such as bilateral asymmetry of the positions of water jackets on the engine 22, similarly to that described for the pair of front main frames 40 and the power-engine fixing parts 42. In the present embodiment, the pair of front under frames 44 and the power-engine fixing parts 46 have a bilaterally symmetrical structure.

On the front side of the aforementioned pair of front under frames 44, a radiator 34 is provided to cool cooling water that passes through the water jackets formed on the cylinder block 23*a* and the cylinder head 23*b* of the engine 22. The radiator 34 is supported by brackets mounted on the front under frames 44. The radiator 34 supported in this way is located forward of the pair of front main frames 40. This position is a forward position of the cylinder head 23*b* of the engine 22. Piping 34P that is drawn from the right and left of the radiator 34 is coupled to the water jackets formed on the cylinder block 23*a* and the cylinder head 23*b*. The aforementioned power-engine fixing parts 42 and 46 are both located below and rearward of the upper end of the radiator 34 in the vehicle.

The air cleaner 19 that removes foreign substances included in the air sucked into the engine 22 is provided upward of the engine 22. The air cleaner 19 is provided in an area from between the pair of front main frames 40 to above them. The air cleaner 19 is located upward of the power-engine fixing parts 42 and 46. The air cleaner 19 is provided at a position below the fuel tank 18 and covered from above by the fuel tank 18.

There is provided an exhaust pipe 35 through which burned gas in the engine 22 is exhausted. One end of the exhaust pipe 35 is connected to the exhaust port of the cylinder head 23*b* of the engine 22 at the front of the cylinder head 23*b*. The exhaust pipe 35 extends downward from the front of the cylinder head 23*b* of the engine 22 through the side of the lower part of the engine 22 toward the rear of the vehicle. The other end of the exhaust pipe 35 extends obliquely upward through the outside of one swing arm 28 toward the rear end of the swing arm 28. The other end of the exhaust pipe 35 is suspended and supported by tandem step stays 36 that are supported by rear auxiliary frames 54. As a whole, the exhaust pipe 35 is located below the motorcycle frame 30.

The throttle body 37 that sends a fuel and air into the engine 22 is provided at a rear upper position of the cylinder head 23*b* of the engine 22. The throttle body 37 is located between the engine 22 and the air cleaner 19. In connection with the motorcycle frame 30, the throttle body 37 is provided at a position above the power-engine fixing parts 42 of the pair of front main frames 40.

On each of the right and left sides of the motorcycle 10, the front main frame 40 and the front under frame 44 are coupled to each other by coupling frame members 48. In the present example, a plurality of coupling frame members 48 couple the front main frame 40 and the front under frame 44 to form a truss structure. More specifically, the opposite ends of each of two coupling frame members 48 are coupled to the front main frame 40 and the front under frame 44 in such a manner that the distance between the connection points of the two coupling frame members 48 to the front main frame 40 is greater than the distance between the connection points of the two coupling frame members 48 to the front under frame 44. Thus, the front main frame 40, the front under frame 44, and the coupling frame members 48 form a truss structure having a trapezoidal shape. The coupling frame members 48 are set to have lower stiffness than the front main frame 40 and the front under frame 44. More specifically, the coupling frame members 48 have a smaller outer diameter than the outer diameters of the front main frame 40 and the front under frame 44.

There may be provided reinforcing frames 47 that extend upward from the rear of the front under frames 44 and that are connected to the front main frames 40. The reinforcing frames 47 extend in the up-and-down direction. The presence of the reinforcing frames 47 further suppresses deformation of the front frames 40 and 44 due to the force applied in the up-and-down direction to the front frames 40 and 44. For example, the reinforcing frames 47 may be welded to the parts of the front main frames 40 that bend in plan view or to the vicinity of these parts.

The pair of rear main frames 50 is provided to extend rearward from the power-engine fixing parts 42 of the pair of front main frames 40. When viewed from one side, the rear main frames 50 extend linearly. In the present embodiment, the rear main frames 50 extend upward as going toward the rear. The front main frames 40 and the rear main frames 50, as viewed from one side, are arranged to form a V-shape pointing downward. Since the front main frames 40 and the rear main frames 50 are welded to each other by the power-engine fixing parts 42, it is possible to make the direction of the rear main frames 50 greatly different from the direction of the front main frames 40.

The pair of rear main frames 50 is made of a member having lower stiffness than the pair of front main frames 40. In the present example, the pair of front main frames 40 and the pair of rear main frames 50 are made of metallic pipe members, and the pipe member of the pair of rear main frames 50 is made to have lower stiffness than the pipe member of the pair of front main frames 40 by making the pipe diameter and thickness of the pair of rear main frames 50 smaller than the pipe diameter and thickness of the pair of front main frames 40. Even if at least one of the front main frames and the rear main frames are other types of frames such as such as frames with a metal plate pressed, casting frames, or forged frames, the above condition can be achieved by appropriately setting the plate thickness of these frames.

As another example, a configuration on each of the right and left sides of the motorcycle 10 may be such that the front main frame and the rear main frame are made of a single continuous rod-like member, and a power-engine fixing part that can be fixed to the engine may be joined to a middle part of the rod-like member by welding or other methods.

The pair of rear main frames 50 is coupled to each other by vehicle-width frames 52. In the present example, the vehicle-width frames 52 are provided in a front part of the pair of rear main frames 50 (at a position above the engine 22) where the distance between the rear main frames 50 in the vehicle width direction gradually decreases, at a plurality of points in a part of the rear main frames 50 that is located rearward of the front part and where the rear main frames 50 extend in parallel with each other, and at the rear ends of the rear main frames 50. The vehicle-width frames 52 are made of a metallic pipe member or a member formed of a metal plate, and joined to the pair of rear main frames 50 by welding or other methods.

The sheet 27 on which a passenger sits is mounted on the pair of rear main frames 50 by brackets or other supports.

The pair of rear auxiliary frames 54 that support the pivot bracket 60 and the engine 22 is provided for the pair of rear main frames 50. The pair of rear auxiliary frames 54 is a long length of member and joined to the rear parts of the pair of rear main frames 50 by welding or other methods. The pair of rear auxiliary frames 54 are provided so as to gradually increase an interval in the up-and-down direction between the pair of rear auxiliary frames 54 and the pair of rear main frames 50 as going toward the front of the vehicle, with the front ends of the pair of rear auxiliary frames 54 located at positions above the rear part of the engine 22. The front ends of the pair of rear auxiliary frames 54 are joined to fixing parts 56 having insertion holes by welding or other methods.

In plan view, the pair of rear auxiliary frames 54 includes parts that are located on the outer side in the width direction of the pair of rear main frames 50. In this layout, the rear main frames 50 are arranged inside the vehicle body, thus readily suppressing an increase in the size of the vehicle body. Besides, a trapezoidal shape can be formed in a cross section perpendicular to the back-and-forth direction by connecting the pair of rear main frames 50 and the pair of rear auxiliary frames 54 with a straight line, thus making it easy to reduce bending stress occurring in each frame 50 or 54.

The tandem step stays 36 that support tandem steps for supporting the feet of a fellow passenger are mounted on the middle part in the direction of extension of the pair of rear auxiliary frames 54.

The pair of rear auxiliary frames 54 has brackets 54P fixed thereto by welding or other methods at positions that are located rearward of the fixing parts 56 in the vehicle. The brackets 54P project downward from the pair of rear auxiliary frames 54. The lower ends of the brackets 54P have insertion holes, so that the brackets 54P can support plate-like brackets 68 and 69.

There may be provided a long length of auxiliary plates 58 between the rear ends of the front main frames 40 (here, power-engine fixing parts 42) and the front ends of the pair of rear auxiliary frames 54. One ends of the auxiliary plates 58 are fixed together with the power-engine fixing parts 42 to the engine 22, and the other ends of the auxiliary plates 58 are fixed together with the fixing parts 56 to the pivot bracket 60. The auxiliary plates 58 may be omitted.

If the auxiliary plates 58 are provided in the vehicle, the force applied in a bending direction to the rear main frames 50 can be suppressed by the auxiliary plates 58 supporting the force applied in its axial direction. By setting the flexural rigidity of the auxiliary plates 58 lower than the flexural rigidity of the rear main frames 50, it is possible to suppress an increase in weight and to readily prevent the force applied from the pivot bracket 60 from being transmitted to the rear main frames 50. The auxiliary plates 58 may be configured to be detachable from the rear main frames 50 by bolting or other methods.

When the engine 22 is observed as a whole, the cylinder head 23b at the front upper part of the engine 22 is supported by the power-engine fixing parts 42 of the pair of front main frames 40 and the power-engine fixing parts 46 of the pair of front under frames 44, and the cylinder block 23a and the crankcase 24 located below the cylinder head 23b are located below the pair of front main frames 40 and the pair of front under frames 44. The rear part of the engine 22 is supported by the pivot bracket 60 fixed to the fixing parts 56 of the pair of rear auxiliary frames 54.

The configuration for supporting the swing arms 28 will now be described in further detail.

Figure 5:
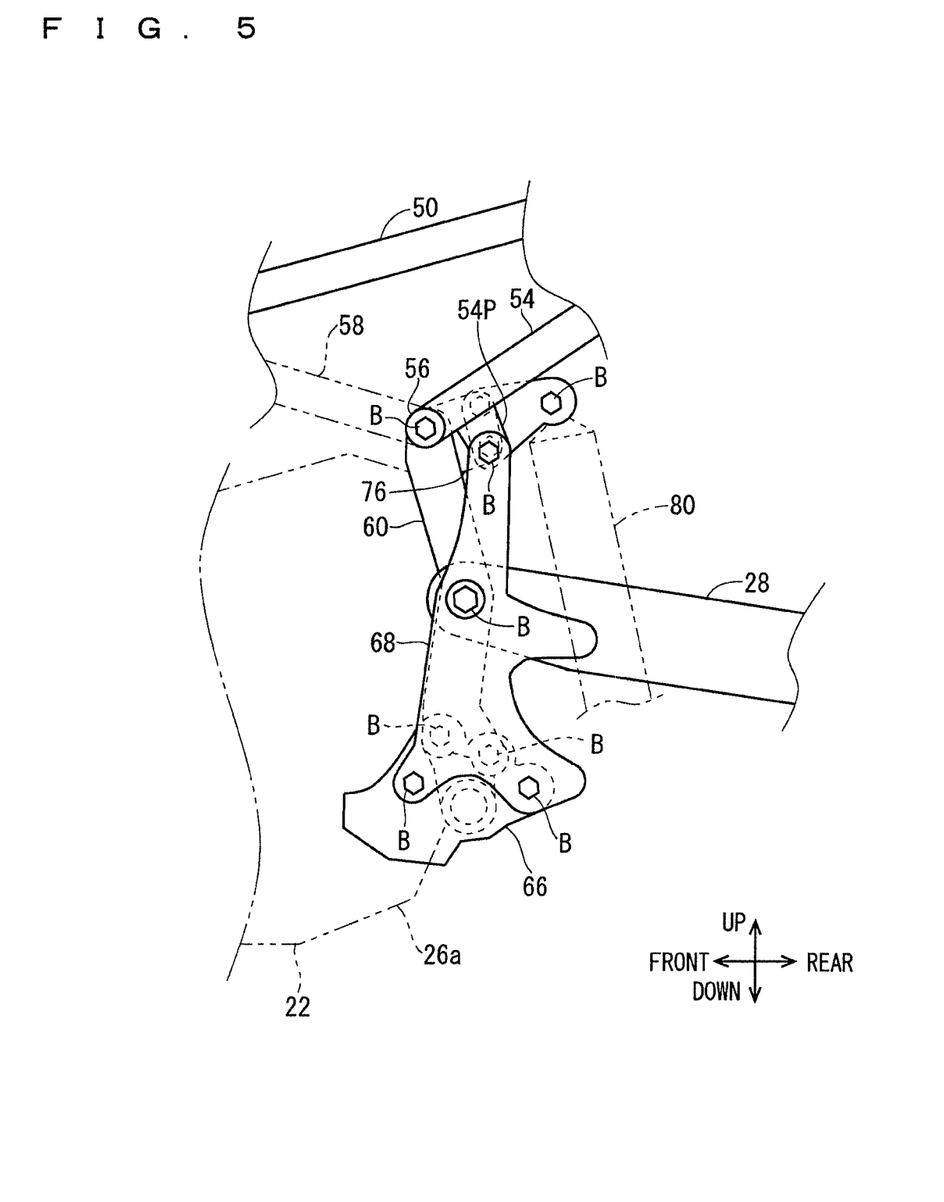
FIG. 5 is a schematic side view illustrating a rear part of the engine that supports swing arms.
Figure 6:
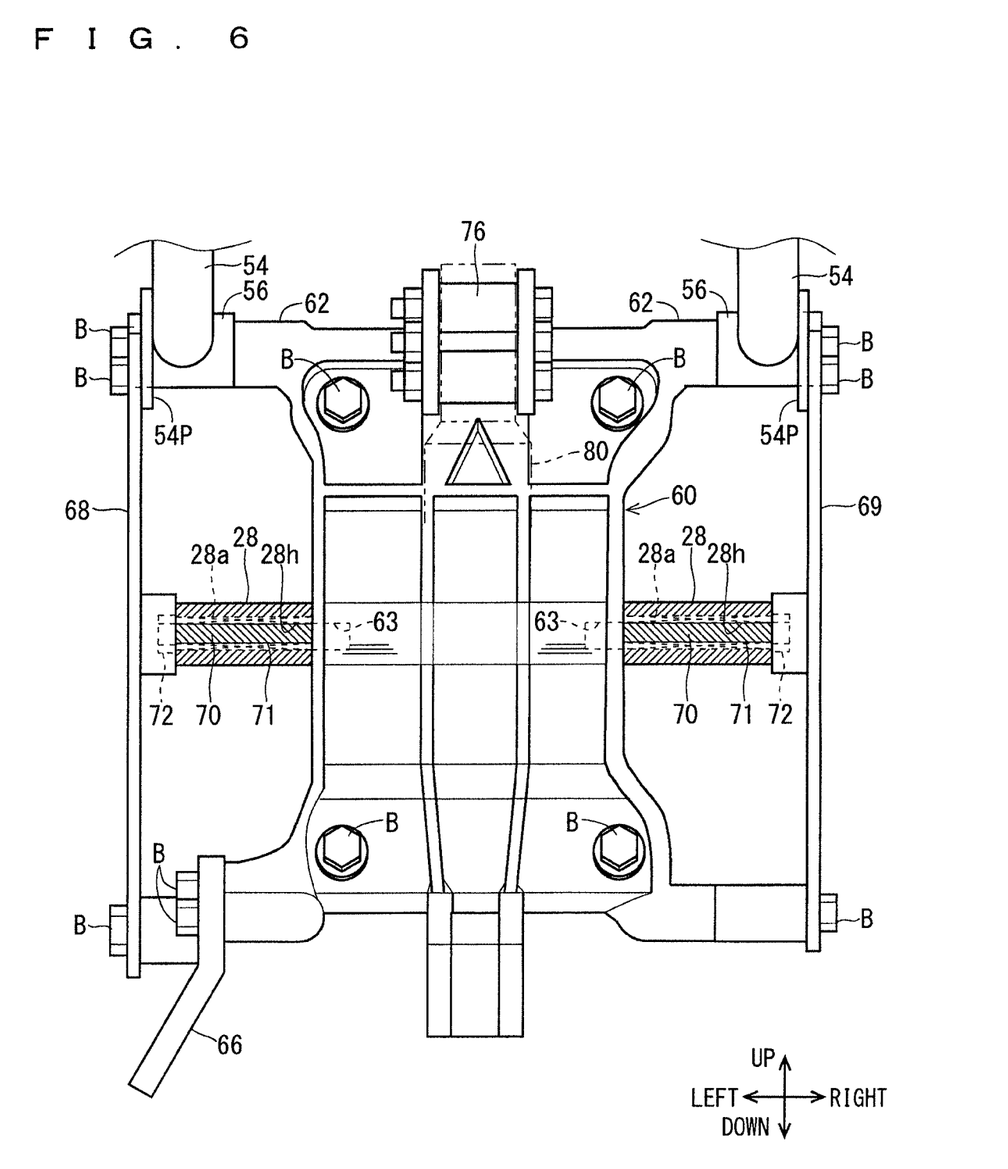
FIG. 6 is a schematic rear view of the aforementioned part as viewed from the rear of the vehicle.

FIG. 5 is a schematic side view of a rear part of the engine 22 that supports the swing arms 28, and FIG. 6 is a schematic rear view of the same part as viewed from the rear of the vehicle.

The swing arms 28 are swingably supported by the pivot bracket 60 provided at the rear of the engine 22.

The pivot bracket 60 is a plate-like member and fixed to the rear of the engine 22 by fasteners B such as bolts.

The pivot bracket 60 has bracket fixing parts 62 formed with screw holes or other fixtures at its upper opposite ends in the vehicle width direction. With the pair of bracket fixing parts 62 disposed between the fixing parts 56 of the pair of rear auxiliary frames 54, fasteners B such as bolts are inserted through the fixing parts 56 and fixed to the bracket fixing parts 62 by screwing or other methods, so that the upper part of the pivot bracket 60 is fixed between the fixing parts 56 of the pair of rear auxiliary frames 54.

The pivot bracket 60 has shaft fixing recesses 63 formed in its middle part in the up-and-down direction on the opposite sides in the vehicle width direction. The shaft fixing recesses 63 may be screw holes and fix pivot shafts 70 therein. The pivot shafts 70 are formed of a member made of metal or other materials, and are configured such that each rod-like shaft part 71 has an external thread at the tip and a head part 72 at the root end, the head part 72 being thicker than the shaft part 71.

Each swing arm 28 has an insertion hole 28h at its front end in the vehicle, the insertion hole 28h being capable of receiving the aforementioned pivot shaft 70. A bearing 28a is provided on the inner circumference of the insertion hole 28h. With the pivot shafts 70 inserted through the insertion holes 28h of the swing arms 28, the tips of the pivot shafts 70 are fixed into the shaft fixing recesses 63 by screwing or other methods. Thus, the swing arms 28 extending toward the rear of the vehicle are supported swingably about the pivot shafts 70. In this state, the head parts 72 prevent the swing arms 28 from coming off the pivot shafts 70.

The pair of pivot shafts 70 is also supported at fixed positions by the plate-like brackets 68 and 69.

The pair of plate-like brackets 68 and 69 is made of a long, slender plate-like member having a length that ranges from the lower ends of the brackets 54P of the rear auxiliary frames 54 to beyond the positions of the pivot shafts 70.

The upper ends of the plate-like brackets 68 and 69 are fixed to the brackets 54P of the rear auxiliary frames 54 by fasteners B such as bolts.

The pivot bracket 60 has an interposed bracket 66 in its lower part on one side in the vehicle width direction, the interposed bracket 66 being fixed by fasteners B such as bolts. The lower end of one plate-like bracket 68 (left one in FIG. 6) is fixed to the interposed bracket 66 by a fastener B such as a bolt.

The lower end of the other plate-like bracket 69 (right one in FIG. 6) is fixed to the lower part of the pivot bracket 60 on the other side in the vehicle width direction.

Thus, the pair of plate-like brackets 68 and 69 is supported to the pair of rear auxiliary frames 54 and supported on both sides of the pivot bracket 60.

In this state, the pair of plate-like brackets 68 and 69 passes outside the corresponding pivot shafts 70, extends in the up-and-down direction, and is held at positions perpendicular to the vehicle width direction.

The head parts 72 of the pivot shafts 70 are fitted in and supported by the middle parts in the direction of extension of the pair of plate-like brackets 68 and 69. Thus, the pair of pivot shafts 70 is supported by the plate-like brackets 68 and 69 from outer sides.

The pivot bracket 60 is also provided with a rear suspension supporter 76 that supports one end of a rear suspension 80.

The rear suspension 80 is formed of a member that includes a shock absorber and a coil spring and plays a role in suppressing vibration and shock of the rear wheel 14. One end of the rear suspension 80 is supported on the rear suspension supporter 76 by fasteners B such as bolts, the rear suspension supporter 76 projecting on the side opposite the engine 22 with respect to the pivot bracket 60. The other end of the rear suspension 80 is coupled directly or via a link structure to the swing arms 28. If the swing arms 28 swing due to vibration or shock of the rear wheel 14, the rear suspension 80 extends and compresses along with the swing to suppress the swing of the swing arms 28.

With this motorcycle 10, the force that the rear wheel 14 tries to advance the motorcycle 10 is mainly transmitted from the pivot shafts 70 via the pivot bracket 60 to the engine 22. The force is then transmitted from the engine 22 via the pair of front main frames 40 and the head pipe 32 to the front wheel 12 and other parts. Accordingly, the force that the rear wheel 14 tries to advance the motorcycle 10 can be transmitted to the entire motorcycle 10, while supporting the engine 22 with a relatively short and simple frame structure.

With the motorcycle frame 30 having the above-described configuration, the stiffness and strength necessary to support the engine 22 can be readily ensured with frames as short as possible, because the pair of front main frames 40 extends toward the engine 22, and the power-engine fixing parts 42 are fixed to the engine 22 at positions that overlap with the engine 22 as viewed in the vehicle width direction. In particular, since the pair of front main frames 40 does not have to include separate brackets or other supports that extend toward the engine to fix the engine, a further weight reduction of the motorcycle frame 30 including the structure for supporting the engine 22 is possible while ensuring the stiffness and strength necessary to support the engine 22.

In the present embodiment, the pair of front main frames 40 is fixed to the rear frame fixing parts 25b formed at the rear part of the cylinder head 23b. The pair of front main frames 40 can be shortened by being fixed to the upper and rear part of the head pipe 32. In the present embodiment, the front main frames 40, as viewed from one side, extend along a first straight line that connects the rear frame fixing parts 25b and the positions at which the front main frames 40 are welded to the head pipe 32, and as a result, the front main frames 40 can be further shortened. More specifically, the present embodiment discloses a case in which the pair of front main frames 40 includes an extended part that extends along an area that overlaps with the first straight line.

The shortening of the front main frames 40 makes it easy to exclude the natural frequency of the front main frames 40 from the frequency of the engine 22, thus suppressing vibration of the motorcycle 10.

Since the pair of rear main frames 50 is formed of a member that is coupled to the pair of front main frames 40 by the power-engine fixing parts 42, the front main frames 40 and the rear main frames 50 can be firmly supported on the engine 22 with a simple configuration. Moreover, the engine 22 can be supported by the pair of front main frames 40 that has high stiffness and high strength, because the pair of rear main frames 50 is formed of a member having lower stiffness than the pair of front main frames 40. On the other hand, the pair of rear main frames 50 that support parts other than the engine 22, such as the sheet 27 and electrical equipment, can be made of a low-stiffness and lightweight member. This enables further reducing the weight of the motorcycle frame 30 as a whole while ensuring the strength and stiffness necessary to support the engine 22.

Both of the front main frames 40 and the rear main frames 50 are fixed by the rear frame fixing parts 25b. This eliminates the need for the engine 22 to include separate parts for fixing the front parts of the rear main frames 50, thus preventing the configuration of the engine 22 from becoming complicated.

The rear auxiliary frames 54 are fixed to the bracket fixing parts 62 of the pivot bracket 60. This eliminates the need for the engine 22 to include separate parts for fixing the front parts of the rear auxiliary frames 54, thus preventing the configuration of the engine 22 from becoming complicated.

When viewed from one side, it is possible to reduce the length in the back-and-forth direction of the base of a triangle that is formed by the rear main frames 50, the rear auxiliary frame 54, and the frame fixing positions of these frames. Thus, the force applied to the frames 50 and 54 as force in the bending direction can be readily reduced.

In particular, the front main frames 40 that extend toward the engine 22 can be relatively short, and the rear main frames 50 are easy to extend relatively long toward the rear. From this point, the weight of the motorcycle frame can be more effectively reduced if the rear main frames 50, which are easy to extend relatively long, is made of a low-stiffness and lightweight member.

As another example, a configuration is also possible in which the front main frames and the rear main frames are separated, the rear main frames include power-engine fixing parts, and the power-engine fixing parts of the rear main frames are fixed to the engine together with the power-engine fixing parts of the front main frames.

Since the power-engine fixing parts 42 of the pair of front main frames 40 are fixed to the cylinder head 23b provided at the relatively upper part of the engine 22, the pair of front main frames 40 can be further shortened, and as a result, a further weight reduction and an increase in stiffness and strength become possible.

Since the power-engine fixing parts 42 are provided at a position below the fuel tank 18, the pair of front main frames 40 can be further shortened. Moreover, the fuel tank 18 that may be heavy can be supported by the pair of front main frames 40 that has strength and stiffness enough to support the power-engine fixing parts 42.

The engine 22 can be more firmly supported by the pair of front under frames 44.

In the present embodiment, the pair of front under frames 44 are fixed to the front frame fixing parts 25a formed at the front part of the cylinder head 23b. The pair of front under frames 44 can be shortened by being fixed to the lower and front part of the head pipe 32. In the present embodiment, the front under frames 44, as viewed from one side, extend along a second straight line that connects the front frame fixing parts 25a and the positions at which the front under frames 44 are welded to the head pipe 32, and as a result, the front under frames 44 can be further shortened. More specifically, the present embodiment discloses a case in which the pair of front under frames 44 includes an extended part that extends along an area that overlaps with the second straight line.

The front main frames 40 and the front under frames 44 can be readily shortened by causing the front main frames 40 and the front under frames 44 to be connected at different positions to the head pipe 32 and the engine 22 as described above.

In the present embodiment, the front frames 40 and 44 linearly tilt upward as going toward the front of the vehicle. Thus, the force received by the rear wheel 14 from the road surface can be linearly transmitted from the cylinder head 23b to the head pipe 32. Accordingly, the force transmitted to the head pipe 32 is readily transmitted as axial force to the front frames 40 and 44, and as a result, the application of the force in the bending direction can be reduced. This suppresses the flexural rigidity of the front frames 40 and 44 and further accelerates weight reduction.

When viewed from one side, the distance in the up-and-down direction between the front main frame 40 and the front under frame 44 decreases as going toward the front. That is, a triangular shape is formed by connecting the two frame fixing parts 25a and 25b and the head pipe 32. This layout can readily suppress the force applied in the bending direction among the force applied to the front frames 40 and 44.

Since the pair of front main frames 40 are coupled to each other in the vehicle width direction via the engine 22, it is possible to omit a member that couples the pair of front main frames 40 to each other in the vehicle width direction and to achieve weight reduction. The pair of rear main frames 50 coupled to each other in the vehicle width direction by the vehicle-width frame 52, on the other hand, can obtain desired strength and stiffness.

A relative relationship among the above-described frames may be arbitrarily set within a range in which desired strength and stiffness can be obtained. For example, the front under frames 44 may be formed to have higher stiffness than the front main frames 40. In this case, for example, the front under frames 44 may be formed to have a greater thickness and a larger outer diameter than the front main frames 40.

Exemplary relationships in flexural rigidity between each frame are follows.

A first conceivable example is that the front main frames 40 and the front under frames 44 have greater flexural rigidity than the rear main frames 50, the rear main frames 50 have greater flexural rigidity than the rear auxiliary frames 54, and the rear auxiliary frames 54 have greater flexural rigidity than the coupling frame members 48.

A second conceivable example is that the front under frames 44 have the same or greater flexural rigidity as or than the front main frames 40, and the front main frames 40 have greater flexural rigidity than the coupling frame members 48.

A third conceivable example is that the rear main frames 50 have greater flexural rigidity than the rear auxiliary frames 54.

Since the swing arms 28 are swingably supported by the pivot bracket 60 fixed to the rear part of the engine 22, the driving force to run the motorcycle 10 forward is mainly transmitted from the swing arms 28 via the pivot bracket 60, the engine 22, and the pair of front main frames 40 to the head pipe 32. Thus, the motorcycle frame 30 is capable of receiving the driving force to run the motorcycle, integrally with the engine 22. Moreover, the weight of the engine 22 can be reduced because the pivot bracket 60 is made to have strength enough to support the swing arms 28 and the rear suspension 80. Besides, it is easy to respond design changes because specification changes or other changes in the swing arms 28 can be handled by specification changes in the pivot bracket 60 without making any specification change in the engine 22.

Since the head parts 72 of the pivot shafts 70 are supported on the opposite sides of the pivot bracket 60 by the pair of plate-like brackets 68 and 69, the pivot shafts 70 of the swing arms 28 can be supported with a compact and simple structure.

The configurations described in the embodiments and variations described above may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention.

As described above, the specification of the present invention includes each aspect of the invention described below.

A motorcycle frame according to a first aspect includes a head pipe, a pair of front main frames that separate in a vehicle width direction from the head pipe, extend toward a power engine that is located on a rear side of the head pipe, and include power-engine fixing parts that are fixed to the power engine at positions that overlap with the power engine as viewed in the vehicle width direction, and a pair of rear main frames that extend rearward respectively from the power-engine fixing parts of the pair of front main frames.

Thus, the stiffness and strength necessary to support the power engine can be ensured with a structure in which the pair of front main frames extends toward the power engine, and the power-engine fixing parts are fixed to the power engine at positions that overlap with the power engine as viewed in the vehicle width direction. Since the front main frames do not necessarily have to include separate brackets that extend toward the power engine to fix the power engine, a further weight reduction of the motorcycle frame including the structure for supporting the power engine is possible while ensuring the stiffness and strength necessary to support the power engine.

A second aspect is directed to the motorcycle frame according to the first aspect, in which the pair of rear main frames is formed of a member that is coupled to the pair of front main frames by the power-engine fixing parts and that has lower stiffness than the pair of front main frames.

Thus, the power engine can be supported by the pair of front main frames having high stiffness and high strength. On the other hand, the pair of rear main frames that support parts other than the power engine can be made of a low-stiffness and lightweight member. Accordingly, a further weight reduction of the motorcycle frame as a whole is possible while ensuring the strength and stiffness necessary to support the power engine.

A third aspect is directed to the motorcycle frame according to the first or second aspect, in which the power engine includes an engine in which a cylinder head is located above a crankcase, and the power-engine fixing parts are fixed to the cylinder head.

Since the power-engine fixing parts are fixed to the cylinder head of the engine, the pair of front main frames can be further shortened.

A fourth aspect is directed to the motorcycle frame according to any one of the first to third aspects, in which the power-engine fixing parts are provided at positions below a fuel tank, as viewed in the vehicle width direction, and the pair of front main frames is coupled to a tank supporter that supports the fuel tank.

Since the power-engine fixing parts are provided at positions below the fuel tank, the pair of front main frames can be further shortened. Moreover, the fuel tank that may be heavy can be supported by the pair of front main frames having strength and stiffness enough to support the power engine.

A fifth aspect is directed to the motorcycle frame according to any one of the first to fourth aspects. The motorcycle frame further includes a pair of front under frames that are provided below the pair of front main frames, separate in the vehicle width direction from the head pipe, and extend toward the power engine to be fixed to the power engine.

Thus, the power engine can be more firmly supported by the pair of front under frames.

A sixth aspect is directed to the motorcycle frame according to any one of the first to fifth aspects, in which the pair of front main frames is coupled to each other in the vehicle width direction via the power engine. The motorcycle frame further includes a vehicle-width frame that couples the pair of rear main frames to each other.

Since the pair of front main frames can be coupled to each other in the vehicle width direction via the power engine, it is possible to omit a member that couples the pair of front main frames to each other in the vehicle width direction and to achieve weight reduction. The pair of rear main frames can be coupled to each other in the vehicle width direction by the vehicle-width frames.

A second aspect is directed to the motorcycle frame according to any one of the first to sixth aspects. The motorcycle frame further includes a pivot bracket that is fixed to a rear part of the power engine, swingably supports swing arms that extend toward the rear of a vehicle, and includes a rear suspension supporter that supports one end of a rear suspension.

Thus, the driving force to run the motorcycle forward is mainly transmitted from the swing arms via the pivot bracket, the power engine, and the pair of front main frames to the head pipe. Thus, the motorcycle frame is capable of receiving the driving force, integrally with the power engine. Moreover, the weight of the power engine can be reduced because the pivot bracket is made to have strength enough to support the swing arms and the rear suspension.

An eighth aspect is directed to the motorcycle frame according to the seventh aspect. The motorcycle frame further includes a pair of rear auxiliary frames that support the pivot bracket and the power engine with respect to the pair of rear main frames, and a pair of plate-like brackets that are supported to said pair of rear auxiliary frames and are supported on opposite sides of the pivot bracket, and that support pivot shafts of the swing arms from outer sides of the pivot bracket.

Thus, the pivot shafts of the swing arms can be supported with a compact and simple structure.

What is claimed is:

1. A motorcycle frame comprising:
   a head pipe;
   a pair of front main frames that separate in a vehicle width direction from said head pipe, extend toward a power engine that is located on a rear side of said head pipe, and include power engine fixing parts that are fixed to said power engine at positions that overlap with said power engine as viewed in the vehicle width direction;
   a pair of rear main frames that extend rearward respectively from said power-engine fixing parts of said pair of front main frames;
   a pivot bracket that is fixed to a rear part of said power engine, swingably supports swing arms that extend toward the rear of the motorcycle frame, and includes a rear suspension supporter that supports one end of a rear suspension;
   a pair of rear auxiliary frames that support said pivot bracket and said power engine with respect to said pair of rear main frames; and
   a pair of brackets that are supported to said pair of rear auxiliary frames and are supported on opposite sides of said pivot bracket, and that support pivot shafts of the swing arms from outer sides of said pivot bracket.

2. The motorcycle frame according to claim 1, wherein said power engine includes a cylinder head located above a crankcase, and
said power-engine fixing parts are fixed to said cylinder head.

3. The motorcycle frame according to claim 1, wherein said power-engine fixing parts are provided at positions below a fuel tank, as viewed in the vehicle width direction, and
said pair of front main frames is coupled to a tank supporter that supports said fuel tank.

4. The motorcycle frame according to claim 1, further comprising:
   a pair of front under frames that are provided below said pair of front main frames, separate in the vehicle width direction from said head pipe, and extend toward said power engine to be fixed to said power engine.

5. The motorcycle frame according to claim 1, wherein a first front main frame of said pair of front main frames is coupled to a second front main frame of said pair of front main frames in the vehicle width direction via said power engine, and wherein
the motorcycle frame further comprises:
   a vehicle-width frame that couples said pair of rear main frames to each other.

* * * * *